United States Patent
Feldman et al.

(10) Patent No.: US 6,793,239 B2
(45) Date of Patent: Sep. 21, 2004

(54) INFLATABLE VEHICLE OCCUPANT PROTECTION DEVICE FOR A VEHICLE WITH THIRD ROW SEATING

(75) Inventors: Peter Feldman, Almont, MI (US); Garry Hayes, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 132 days.

(21) Appl. No.: 09/989,564

(22) Filed: Nov. 20, 2001

(65) Prior Publication Data

US 2003/0094796 A1 May 22, 2003

(51) Int. Cl.⁷ .......................... B60R 21/22; B60R 21/16
(52) U.S. Cl. ................. 280/729; 280/730.2; 280/743.1; 280/749
(58) Field of Search .............................. 280/730.2, 749, 280/743.1, 729

(56) References Cited

U.S. PATENT DOCUMENTS

| | | |
|---|---|---|
| 5,322,322 A | 6/1994 | Bark et al. |
| 5,480,181 A | 1/1996 | Bark et al. |
| 5,788,270 A | 8/1998 | Haland et al. |
| 5,865,462 A | 2/1999 | Robins et al. |
| 6,010,149 A | 1/2000 | Riedel et al. |
| 6,129,377 A | 10/2000 | Okumura et al. |
| 6,152,485 A | 11/2000 | Kato |
| 6,173,989 B1 | 1/2001 | Stutz |
| 6,485,048 B2 * | 11/2002 | Tajima et al. ............. 280/728.2 |
| 6,517,104 B1 * | 2/2003 | Patel ........................ 280/743.2 |
| 6,517,110 B1 * | 2/2003 | Butters et al. .............. 280/749 |
| 2003/0075910 A1 * | 4/2003 | Inoue et al. ................. 280/749 |

OTHER PUBLICATIONS

Co–pending U.S. patent application. Ser. No. 09/839,912, filed April 20, 2001 for "Inflatable Curtain".

* cited by examiner

*Primary Examiner*—Eric Culbreth
(74) *Attorney, Agent, or Firm*—Tarolli, Sundheim, Covell & Tummino L.L.P.

(57) ABSTRACT

Apparatus (10) for helping to protect an occupant of a vehicle (12) that has a side structure (16), a roof (18), and A, B, C, and D pillars (22, 24, 26, 28) includes a first inflatable vehicle occupant protection device (50) that is inflatable away from the vehicle roof into a position between the side structure of the vehicle and a vehicle occupant. The first inflatable vehicle occupant protection device (50), when inflated, is positioned generally between only the C pillar (26) and the D pillar (28) of the vehicle (12). The apparatus (10) also includes an inflation fluid source (52) for providing inflation fluid for inflating the first inflatable vehicle occupant protection device (50).

19 Claims, 4 Drawing Sheets

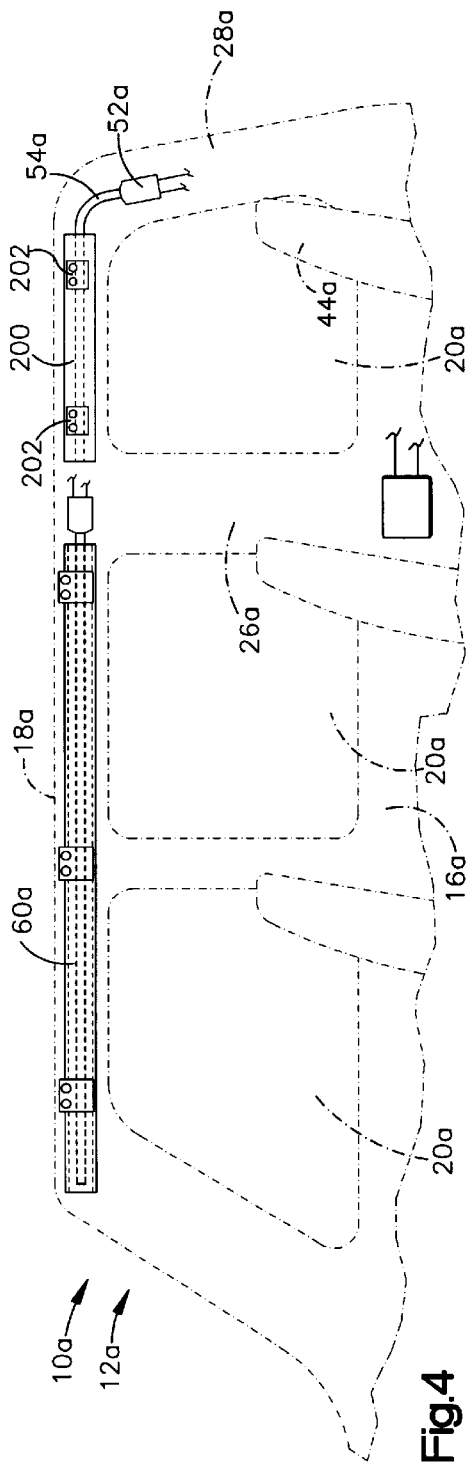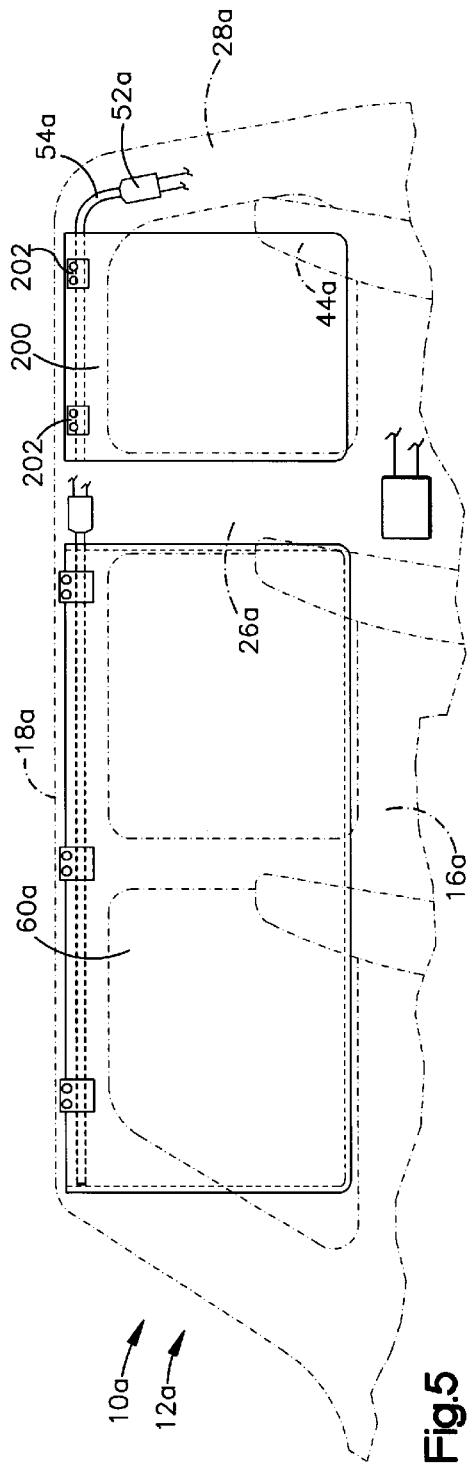

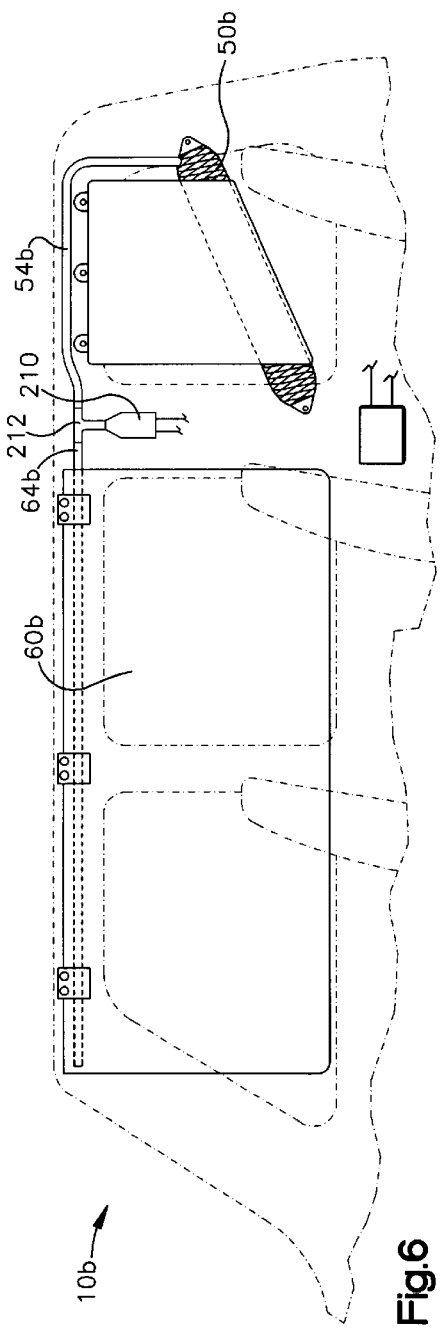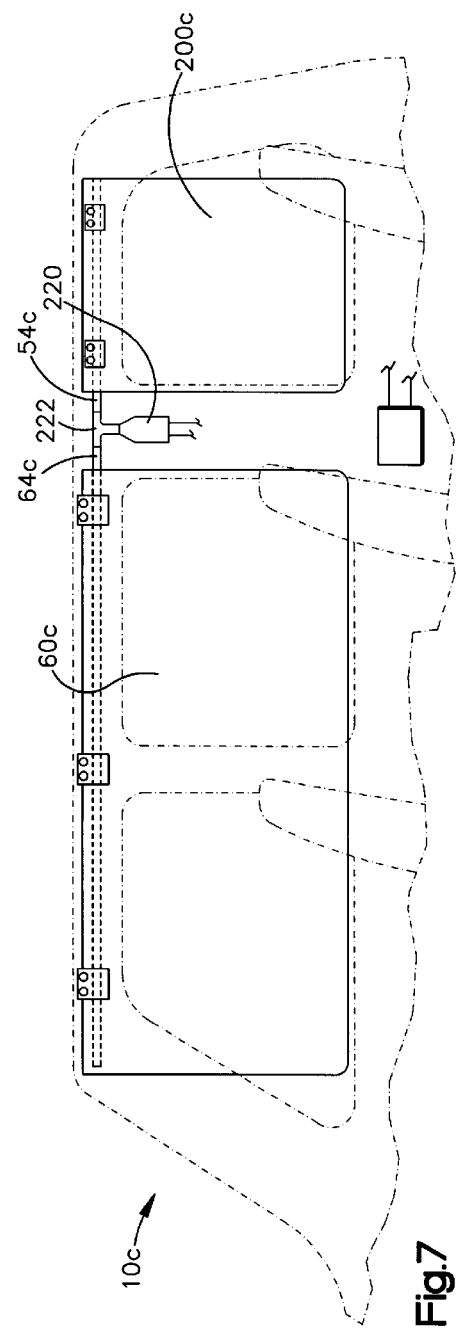

INFLATABLE VEHICLE OCCUPANT PROTECTION DEVICE FOR A VEHICLE WITH THIRD ROW SEATING

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. Another particular type of inflatable vehicle occupant protection device is an inflatable tubular structure that inflates between the side structure of the vehicle and a vehicle occupant in the event of a side impact or rollover. A known inflatable curtain and a known inflatable tubular structure are inflated from a deflated condition by inflation fluid directed from an inflator to the inflatable curtain.

SUMMARY OF THE INVENTION

The present invention relates to an apparatus for helping to protect an occupant of a vehicle that has a side structure, a roof, and A, B, C, and D pillars. The apparatus includes a first inflatable vehicle occupant protection device that is inflatable away from the vehicle roof into a position between the side structure of the vehicle and a vehicle occupant. The first inflatable vehicle occupant protection device, when inflated, is positioned generally between only the C pillar and the D pillar of the vehicle. The apparatus also includes an inflation fluid source for providing inflation fluid for inflating the first inflatable vehicle occupant protection device.

The present invention also relates to an apparatus for helping to protect an occupant of a vehicle that has a side structure, a roof, and first, second and third rows of seating. The apparatus includes a first inflatable vehicle occupant protection device that is inflatable away from the vehicle roof into a position solely between the side structure of the vehicle and the third row of seating. The apparatus also includes an inflation fluid source for providing inflation fluid for inflating the first inflatable vehicle occupant protection device.

The present invention further relates to an apparatus for helping to protect an occupant of a vehicle that has a side structure, a roof, and first, second and third rows of seating. The apparatus includes a first inflatable vehicle occupant protection device that is inflatable away from the vehicle roof into a position between the side structure of the vehicle and the third row of seating. The apparatus also includes a second inflatable vehicle occupant protection device that is inflatable away from the vehicle roof into a position between the side structure of the vehicle and the first and second rows of seating. The apparatus further includes a single inflator for providing inflation fluid for inflating the first and second inflatable vehicle occupant protection devices.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 4 is a schematic view of an apparatus for helping to protect a vehicle occupant illustrating the apparatus in a deflated condition, according to a second embodiment of the invention;

FIG. 5 is a schematic view of the apparatus of FIG. 4 in an inflated condition;

FIG. 6 is a schematic view of an apparatus for helping to protect a vehicle occupant illustrating the apparatus in an inflated condition, according to a third embodiment of the invention; and FIG. 7 is a schematic view of an apparatus for helping to protect a vehicle occupant illustrating the apparatus in an inflated condition, according to a fourth embodiment of the invention.

DESCRIPTION OF PREFERRED EMBODIMENTS

Figure 1:
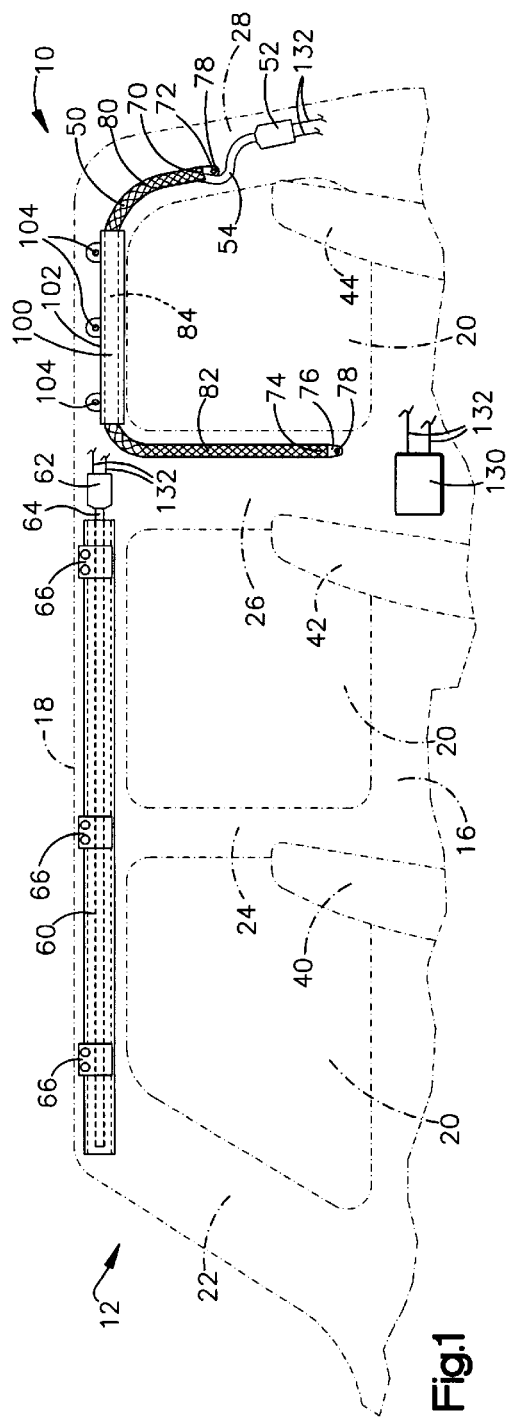
FIG. 1 is a schematic view of an apparatus for helping to protect a vehicle occupant illustrating the apparatus in a deflated condition, according to a first embodiment of the invention.
Figure 2:
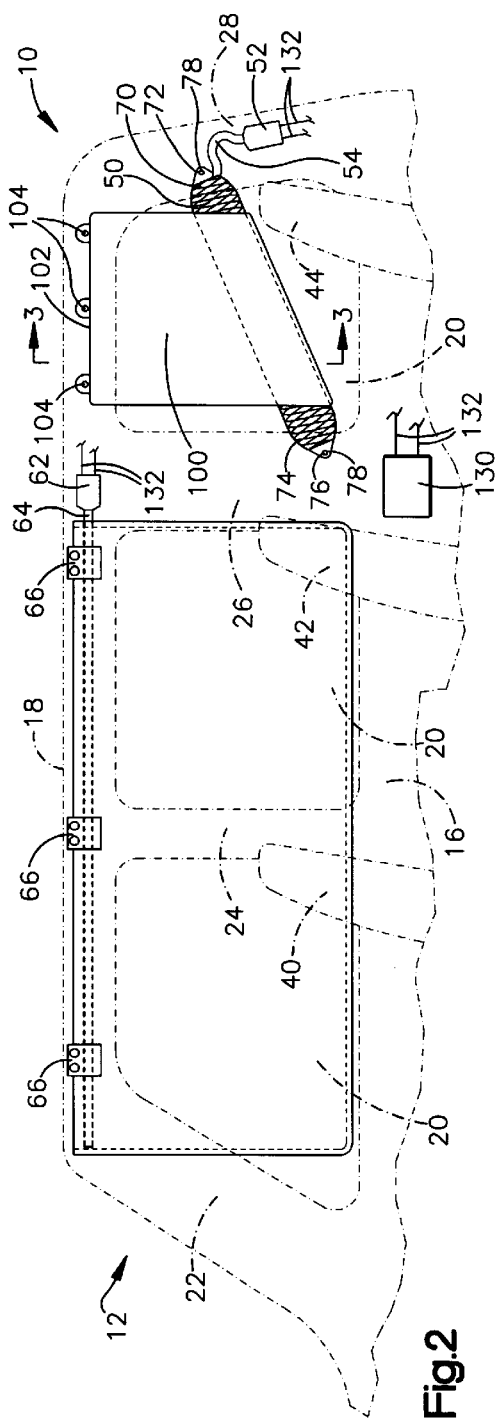
FIG. 2 is a schematic view of the apparatus of FIG. 1 in an inflated condition.

As representative of the present invention, an apparatus 10 helps to protect an occupant of a vehicle 12. As shown in FIGS. 1 and 2, the vehicle 12 includes a side structure 16 and a roof 18. The side structure 16 of the vehicle 12 includes side windows 20, an A pillar 22, a B pillar 24, a C pillar 26, and a D pillar 28. The vehicle 12 also includes first row seating 40, second row seating 42 and third row seating 44. The apparatus 10 includes a first inflatable vehicle occupant protection device in the form of an inflatable tubular structure 50 and a second inflatable vehicle occupant protection device in the form of an inflatable curtain 60.

The inflatable tubular structure 50 is connected in fluid communication with an inflation fluid source in the form of an inflator 52 that provides inflation fluid for inflating the inflatable tubular structure. The inflation fluid is delivered from the inflator 52 to the inflatable tubular structure 50 through a fill tube 54. In the embodiment illustrated in FIGS. 1 and 2, the fill tube 54 is constructed of a suitable flexible material, such as plastic, fabric, or rubber. Those skilled in the art will recognize that the fill tube 54 could be omitted, and the inflator 52 could be connected directly to or mounted inside the inflatable tubular structure 50.

The inflatable curtain 60 is connected in fluid communication with an inflation fluid source in the form of an inflator 62 that provides inflation fluid for inflating the inflatable curtain 60. The inflation fluid is delivered from the inflator 62 to the inflatable curtain 60 through a fill tube 64. In the embodiment illustrated in FIGS. 1 and 2, the fill tube 64 is constructed of a generally rigid material, such as metal or plastic, but could also be constructed of a more flexible plastic or fabric material. Those skilled in the art will recognize that the fill tube 64 could be omitted, and the inflator 62 could be connected directly to or mounted inside the inflatable curtain 60.

The inflators 52 and 62 contain a stored quantity of pressurized inflation fluid (not shown) in the form of a gas to inflate the inflatable tubular structure 50 and the inflatable curtain 60, respectively. The inflators 52 and 62 alternatively could contain a combination of pressurized inflation fluid and ignitable material for heating the inflation fluid, or could be pyrotechnic inflators that use the combustion of gas-generating material to generate inflation fluid. As a further alternative, the inflators 52 and 62 could be of any suitable type or construction for supplying a medium for inflating the inflatable tubular structure 50 and the inflatable curtain 60, respectively.

The inflatable curtain 60 is stored in a deflated condition by known means (not shown), such as a housing. The deflated inflatable curtain 60 has an elongated configuration and extends along the vehicle roof 18 and along the side structure 16 of the vehicle 12 above the side windows 20. The inflatable curtain 60 and the fill tube 62 are connected to the vehicle 12 by known means, such as brackets 66.

The inflatable curtain 60 has a known construction comprising overlying panels that are woven, sewn, or otherwise interconnected to define an inflatable volume. The inflatable curtain 60 is preferably constructed of a fabric, such as nylon, that may be coated with a gas impermeable material, such as urethane or silicone. Other materials, such as elastomers, plastic films, or combinations thereof, may also be used to construct the inflatable curtain 60. The inflatable curtain 60 may also have a single or multi-layered construction.

The inflatable tubular structure 50 is stored in a deflated condition by known means (not shown), such as a housing. The inflatable tubular structure 50 has a first end 70 connected to the side structure 16 of the vehicle 12 at a first location 72 and an opposite second end 74 connected to the side structure at a second location 76. The first and second ends 70 and 74 are connected to the side structure 16 by known means, such as fasteners 78. In the embodiment illustrated in FIGS. 1 and 2, the first location is on the D pillar 28 and the second location is on the C pillar 26. The inflatable tubular structure 50, when in the deflated condition, has an elongated configuration with a first portion 80 extending along the D pillar 28. A second portion 82 of the inflatable tubular structure 50 extends along the C pillar 26. A third portion 84 of the inflatable tubular structure 50, which is located between the first and second portions 80 and 82, extends along the vehicle roof 18 and along the side structure 16 of the vehicle 12 above a side window 20.

The apparatus 10 includes a sling 100 that has an has an upper edge portion 102 connected to the side structure 16 of the vehicle 12 near the intersection of the side structure and the vehicle roof 18. The sling 100 is connected to the side structure by known means, such as fasteners 104. When the inflatable tubular structure 50 is in the inflated condition of FIG. 2, a portion of the tubular structure (essentially the third portion 84) extends through the sling 100.

Figure 3:
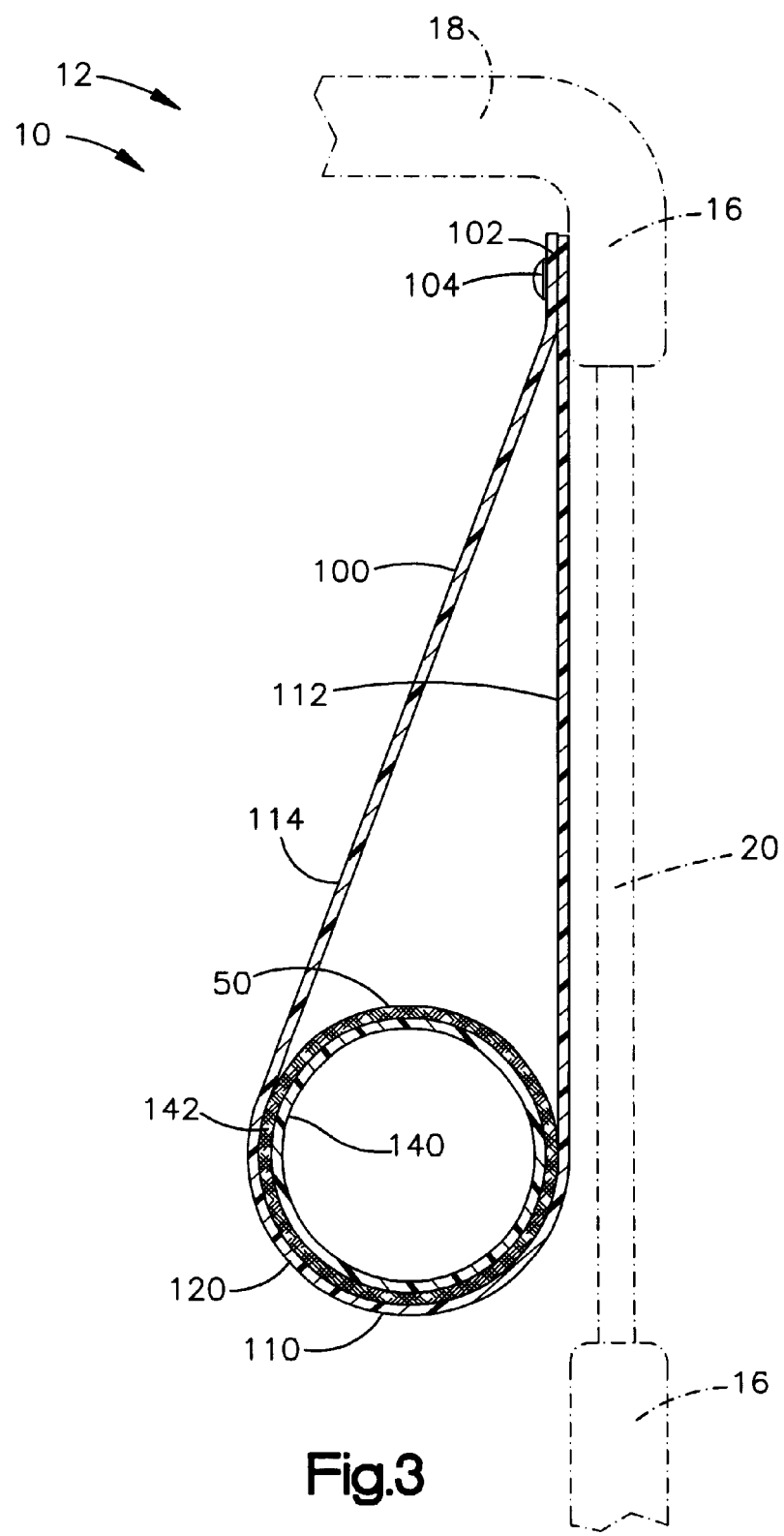
FIG. 3 is a sectional view of the apparatus taken generally along line 3—3 in FIG. 2.

As illustrated in FIG. 3, the sling is constructed of a sheet of material that is folded over generally along a fold portion 110 to form overlying panels 112 and 114 of the sling. When the inflatable tubular structure 50 is in the inflated position illustrated in FIGS. 2 and 3, the first panel 112 is positioned adjacent the vehicle side structure 16.

The inflatable tubular structure 50 extends between the first and second panels 112 and 114 of the sling 100. When the inflatable tubular structure 50 is in the inflated position of FIGS. 2 and 3, the tubular structure is supported in the sling 100 in a lower portion 120 of the sling, opposite the upper edge portion 102. The lower portion 120 is defined by portions of the first and second panels 112 and 114 extending along the fold portion 110 of the sling 100.

When inflated, the inflatable tubular structure 50 (FIG. 2) extends at an acute angle along the vehicle side structure 16, in a direction generally downward and forward from the first location on the D pillar 28 to the second location on the C pillar 26. The lower portion 120 of the sling 100 extends at an acute angle along the vehicle side structure 16, in a direction generally downward and forward from a position near the D pillar 28 to a position near the C pillar 26 of the vehicle 12. The acute angle at which the lower portion 120 extends coincides generally with an acute angle along which the inflated tubular structure 50 extends. Those skilled in the art will appreciate that the inflatable tubular structure 50 and the lower portion 120 of the sling 100 could extend at some other angle along the side structure 16 of the vehicle 12. Those skilled in the art will also appreciate that the sling 100 could be omitted. In this instance, the inflatable tubular structure 50 could be positioned vertically higher in the vehicle 12 relative to the window 20.

The vehicle 12 includes a sensor mechanism 130 (shown schematically in FIGS. 1 and 2) for sensing a side impact to the vehicle 12 and/or a rollover of the vehicle 12. The sensor mechanism 130 actuates the inflators 52 and 62 in response to the sensing of a side impact or a vehicle rollover. In the event of a rollover of the vehicle or a side impact to the vehicle 12 for which inflation of the inflatable tubular structure 50 and/or the inflatable curtain 60 is desirable, the sensor mechanism 130 provides an electrical signal over lead wires 132 to the inflators 52 and 62. The electrical signal causes the inflators 52 and 62 to be actuated in a known manner. The inflators 52 and 62 discharge inflation fluid under pressure through the respective fill tubes 54 and 64. The inflation fluid is thus directed into the inflatable tubular structure 50 and the inflatable curtain 60.

The inflatable tubular structure 50 and the inflatable curtain 60 inflate under the pressure of the inflation fluid from the inflators 52 and 62, respectively. The inflatable tubular structure 50 and the inflatable curtain 60 inflate away from the roof 18 in a downward direction as shown in the drawings and in a downward direction with respect to the direction of forward travel of the vehicle 12 into a deployed position illustrated in FIGS. 2 and 3.

The inflatable tubular structure 50, when inflated, extends along the side structure 16 of the vehicle 12 and is positioned between the side structure and the third row of seating 44. The inflatable tubular structure 50 is thus positioned between the side structure 16 and any occupant (not shown) of the third row seating 44. The inflatable tubular structure 50, when inflated, extends between the C pillar 26 and the D pillar 28 of the vehicle 12 and may overlie portions of the C pillar and the D pillar.

The inflatable curtain 60, when inflated, extends along the side structure 16 of the vehicle 12 and is positioned between the side structure and the first and second rows of seating 40 and 42. The inflatable curtain 60 is thus positioned between the side structure 16 and any occupant (not shown) of the first and second row seating 40 and 42. The inflatable curtain 60, when inflated, extends between the A pillar 22 and the C pillar 26 of the vehicle 12 and may overlie portions of the A pillar, C pillar, and the B pillar 24 of the vehicle.

The inflatable tubular structure 50 and the inflatable curtain 60, when inflated, help to protect vehicle occupants in the first, second and third row seating 40, 42 and 44 in the event of a vehicle rollover or a side impact to the vehicle 12. The inflatable tubular structure 50 and the inflatable curtain 60, when inflated, help to absorb the energy of impacts with the tubular structure and the curtain, respectively. The inflatable tubular structure 50 and the inflatable curtain 60 help to distribute the impact energy over a large area of their respective structures.

As illustrated in FIG. 3, the inflatable tubular structure 50 is preferably constructed as an inflatable tubular bladder 140, fabricated of a generally elastic material, surrounded by a braided tube 142, fabricated of generally inelastic fabric material. When inflated, the generally elastic material of the inflatable bladder 140 expands, i.e. stretches, within the braided tube 142. As the inflatable bladder 140 expands, the braided tube 142 expands radially and contracts lengthwise. In other words, the braided tube 142 increases in diameter and decreases in length. This shortening in length draws the inflatable tubular structure 50 taut between the first and second locations 72 and 76, which causes the tubular structure to move from the stored position of FIG. 1 to the deployed position of FIG. 2.

As the inflatable tubular structure 50 is inflated, the tubular structure pulls the sling 100 from the stored position (FIG. 1) to the deployed position (FIG. 2). Preferably, the sling 100 is configured to prevent further movement of the inflatable tubular structure 50 away from the vehicle roof when the tubular structure reaches the deployed position. The sling 100 may thus be tensioned by the inflated tubular structure 50. The sling 100 thus may also help to absorb the energy of impacts with the sling and help to distribute the impact energy over a large area of the sling when the inflatable tubular structure 50 is inflated.

The vehicle 12 may be equipped with third row seating 44 that is removable or that folds down so as to allow for transporting cargo in the area of the third row seating. Those skilled in the art will recognize that the presence of cargo in the area of the third row seating 28 may block or otherwise inhibit deployment of the inflatable tubular structure 50 and the sling 100. As a feature of the present invention, the inflatable tubular structure 50 and the sling 100 are deployed independently of the inflatable curtain 60. This helps to allow proper inflation of the inflatable curtain 60 in the event that deployment of the inflatable tubular structure 50 and the sling 100 is blocked or otherwise inhibited by cargo in the area of the third row seating 44.

A second embodiment of the present invention is illustrated in FIGS. 4 and 5. The second embodiment of the invention is similar to the first embodiment of the invention illustrated in FIGS. 1–3. Accordingly, numerals similar to those of FIGS. 1–3 will be utilized in FIGS. 4 and 5 to identify similar components, the suffix letter "a" being associated with the numerals of FIGS. 4 and 5 to avoid confusion. The apparatus 10a of the second embodiment of the present invention is identical to the apparatus 10 of the first embodiment (FIGS. 1–3), except that the first inflatable vehicle occupant protection device of the second embodiment (FIGS. 4 and 5) has a different configuration than the first inflatable vehicle occupant protection device of the first embodiment (FIGS. 1–3).

As illustrated in FIGS. 4 and 5, the apparatus 10a includes a first inflatable vehicle occupant protection device in the form of an inflatable curtain 200. The inflatable curtain 200 is connected in fluid communication with the inflator 52a via the fill tube 54a. In the second embodiment, the fill tube 54a is preferably constructed of a generally rigid material, such as metal or plastic, but could also be constructed of a more flexible plastic or fabric material. Those skilled in the art will recognize that the fill tube 54a could be omitted, and the inflator 52a could be connected directly to or mounted inside the inflatable curtain 200.

The inflatable curtain 200 has a construction similar to the inflatable curtain 60 of the first embodiment (FIGS. 1–3). The inflatable curtain 200 is stored in a deflated condition (FIG. 4) by known means (not shown), such as a housing. The deflated inflatable curtain 200 has an elongated configuration and extends along the vehicle roof 18a and along the side structure 16a of the vehicle 12a above the side windows 20a adjacent the third row of seating 44a. The inflatable curtain 200 and the fill tube 54a are connected to the vehicle 12a by known means, such as brackets 202.

The inflatable curtain 200 inflates under the pressure of the inflation fluid from the inflator 52a. The inflatable curtain 200 inflates away from the roof 18a in a downward direction as shown in the drawings and in a downward direction with respect to the direction of forward travel of the vehicle 12a into a deployed position illustrated in FIG. 5.

The inflatable curtain 200, when inflated, extends along the side structure 16a of the vehicle 12a and is positioned between the side structure and the third row of seating 44a. The inflatable curtain 200 is thus inflated between the side structure 16a of the vehicle 12a and any occupant (not shown) of the third row seating 44a. The inflatable curtain 200, when inflated, extends between the C pillar 26a and the D pillar 28a of the vehicle 12a and may overlie portions of the C pillar and the D pillar.

The inflatable curtain 200, when inflated, helps protect a vehicle occupant in the event of a vehicle rollover or a side impact to the vehicle 12a. The inflatable curtain 200, when inflated, helps absorb the energy of impacts with the curtain and helps distribute the impact energy over a large area of the curtain. The inflatable curtain 200 is deployed independently of the inflatable curtain 60a and thus helps prevent blocking or otherwise inhibiting deployment of the inflatable curtain 60a in the event that cargo is present in the area of the third row seating 44a.

A third embodiment of the present invention is illustrated in FIG. 6. The third embodiment of the invention is similar to the first embodiment of the invention illustrated in FIGS. 1–3. Accordingly, numerals similar to those of FIGS. 1–3 will be utilized in FIG. 6 to identify similar components, the suffix letter "b" being associated with the numerals of FIG. 6 to avoid confusion. The apparatus 10b of the third embodiment of the present invention is identical to the apparatus 10 of the first embodiment (FIGS. 1–3), except that the inflation fluid source of the third embodiment (FIG. 6) has a different configuration than the inflation fluid source of the first embodiment (FIGS. 1–3).

As illustrated in FIG. 6, the apparatus 10b includes a first inflatable vehicle occupant protection device in the form of an inflatable tubular structure 50b and a second inflatable vehicle occupant protection device in the form of an inflatable curtain 60b. The inflatable tubular structure 50b and the inflatable curtain 60b are identical to those of first embodiment illustrated in FIGS. 1–3, except that the tubular structure and the curtain of the third embodiment (FIG. 6) share a common inflation fluid source in the form of a single inflator 210.

The inflator 210 includes a junction 212 for diverting the inflation fluid from the inflator to the fill tubes 54b and 646b. The inflator 212 thus provides inflation fluid for inflating both the inflatable tubular structure 50b and the inflatable curtain 60b. This may help to simplify the configuration of the apparatus 10b and also may help to reduce costs associated with manufacturing and installation.

A fourth embodiment of the present invention is illustrated in FIG. 7. The fourth embodiment of the invention is similar to the second embodiment of the invention illustrated in FIGS. 4 and 5. Accordingly, numerals similar to those of FIGS. 4 and 5 will be utilized in FIG. 7 to identify similar components, the suffix letter "c" being associated with the numerals of FIG. 7 to avoid confusion. The apparatus 10c of the fourth embodiment of the present invention is identical to the apparatus 10 of the second embodiment (FIGS. 4 and 5), except that the inflation fluid source of the fourth embodiment (FIG. 7) has a different configuration than the inflation fluid source of the second embodiment (FIGS. 4 and 5).

As illustrated in FIG. 7, the apparatus 10c includes a first inflatable vehicle occupant protection device in the form of an inflatable curtain 200c and a second inflatable vehicle occupant protection device in the form of an inflatable curtain 60c. The inflatable curtain 200c and the inflatable curtain 60c are identical to those of first embodiment illustrated in FIGS. 4 and 5, except that the curtains of the fourth embodiment (FIG. 7) share a common inflation fluid source in the form of a single inflator 220.

The inflator 220 includes a junction 222 for diverting the inflation fluid from the inflator to the fill tubes 54c and 64c. The inflator 222 thus provides inflation fluid for inflating both of the inflatable curtains 200c and 60c. This may help to simplify the configuration of the apparatus 10c and also may help to reduce costs associated with manufacturing, installation, labor, etc.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure, a roof, and A, B, C, and D pillars, said apparatus comprising:

a first inflatable vehicle occupant protection device that is inflatable away from the vehicle roof into a position between the side structure of the vehicle and a vehicle occupant, said first inflatable vehicle occupant protection device, when inflated, being positioned generally between only the C pillar and the D pillar of the vehicle;

a second inflatable vehicle occupant protection device that is inflatable away from the vehicle roof into a position between the side structure of the vehicle and a vehicle occupant, said second inflatable vehicle occupant protection device, when inflated, extending from adjacent the A pillar to adjacent the C pillar and overlying the B pillar; and an inflation fluid source for providing inflation fluid for inflating said first and second inflatable vehicle occupant protection devices.

2. Apparatus as defined in claim 1, wherein said inflation fluid source comprises an inflator.

3. Apparatus as defined in claim 1, further comprising at least one fill tube for directing said inflation fluid from said inflation fluid source into said first and second inflatable vehicle occupant protection devices to inflate said first and second inflatable vehicle occupant protection devices.

4. Apparatus as defined in claim 1, wherein said first inflatable vehicle occupant protection device comprises an inflatable curtain, said inflatable curtain having a stored position extending along the side structure adjacent to the vehicle roof.

5. Apparatus as defined in claim 1, wherein said first inflatable vehicle occupant protection device comprises an inflatable tubular structure, said inflatable tubular structure having a stored position extending along the side structure adjacent to the vehicle roof.

6. Apparatus as defined in claim 5, wherein said inflatable tubular structure has a first end and an opposite second end, said first and second ends being connected to the side structure of the vehicle.

7. Apparatus as defined in claim 6, wherein said first end of said inflatable tubular structure is connected to the D pillar at a position spaced a first distance from the roof of the vehicle and said second end of said inflatable tubular structure is connected to the C pillar at a position spaced a second distance from the roof of the vehicle greater than the first distance, said inflatable tubular structure extending generally diagonally downward and forward in the vehicle from the D pillar to the C pillar.

8. Apparatus as defined in claim 6, further comprising a sling connected to the vehicle near the intersection of the side structure of the vehicle and the vehicle roof, said inflatable tubular structure extending through said sling, said inflatable tubular structure, upon inflation, pulling on said sling in a direction generally away from the vehicle roof, said sling supporting said inflatable tubular structure in a predetermined position adjacent the vehicle side structure.

9. Apparatus as defined in claim 8, wherein said sling comprises a sheet of material folded over generally along a fold portion to form overlying panels, said sling having an upper edge portion opposite said fold portion, said upper edge portion being connected to the vehicle near the intersection of the side structure of the vehicle and the vehicle roof, said inflatable tubular structure being positioned between said overlying panels, said sling preventing further movement of said inflatable tubular structure away from the vehicle roof when said inflatable tubular structure reaches said predetermined position adjacent the vehicle side structure.

10. Apparatus as defined in claim 1, wherein said second inflatable vehicle occupant protection device comprises an inflatable curtain.

11. Apparatus as defined in claim 1, wherein said first inflatable device, when inflated, overlies a portion of a C pillar and a D pillar of the vehicle.

12. Apparatus as defined in claim 1, wherein said second inflatable device, when inflated, overlies portions of the A pillar and C pillar of the vehicle.

13. Apparatus for helping to protect an occupant of a vehicle that has a side structure, a roof, and first, second and third rows of seating, said apparatus comprising:

a first inflatable vehicle occupant protection device that is inflatable away from the vehicle roof into a position between the side structure of the vehicle and the third row of seating;

a second inflatable vehicle occupant protection device that is inflatable away from the vehicle roof into a position between the side structure and the first row of seating and between the side structure and the second row of seating; and an inflation fluid source for providing inflation fluid for inflating said first inflatable vehicle occupant protection device.

14. Apparatus for helping to protect an occupant of a vehicle that has a side structure, a roof, and first, second and third rows of seating, said apparatus comprising:

a first inflatable vehicle occupant protection device that is inflatable away from the vehicle roof into a position between the side structure of the vehicle and the third row of seating;

a second inflatable vehicle occupant protection device that is inflatable away from the vehicle roof into a position between the side structure of the vehicle and the first row of seating and between the side structure of the vehicle and the second row of seating; and a source for providing inflation fluid for inflating said first and second inflatable vehicle occupant protection devices.

15. Apparatus for helping to protect an occupant of a vehicle that has a side structure, a roof, and first, second and third rows of seating, said apparatus comprising:

an inflatable tubular structure that is inflatable away from the vehicle roof into a position between the side structure of the vehicle and the third row of seating;

an inflatable curtain that is inflatable away from the vehicle roof into a position between the side structure of the vehicle and the first row of seating and between the side structure of the vehicle and the second row of seating; and a source for providing inflation fluid for inflating said inflatable tubular structure and said inflatable curtain.

16. Apparatus for helping to protect an occupant of a vehicle that has a side structure, a roof, and first, second and third rows of seating, said apparatus comprising:

a first inflatable curtain that is inflatable away from the vehicle roof into a position between the side structure of the vehicle and the third row of seating;

a second inflatable curtain that is inflatable away from the vehicle roof into a position between the side structure of the vehicle and the first row of seating and between the side structure of the vehicle and the second row of seating; and a source for providing inflation fluid for inflating said first and second inflatable curtains.

17. Apparatus for helping to protect an occupant of a vehicle that has a side structure, a roof, and first, second and third rows of seating, said apparatus comprising:

a first inflatable vehicle occupant protection device that is inflatable away from the vehicle roof into a position between the side structure of the vehicle and two of the rows of seating;

a second inflatable vehicle occupant protection deive that is inflatable away from the vehicle roof into a position between the side structure of the vehicle and the other of the rows of seating; and a source for providing inflation fluid for inflating said first and second inflatable vehicle occupant protection devices.

18. Apparatus as defined in claim 17, wherein said source for providing inflation fluid comprises a single inflator for providing inflation fluid for inflating said first and second inflatable vehicle occupant protection devices.

19. Apparatus as defined in claim 17, wherein said source for providing inflating fluid comprises a first inflator for providing inflation fluid for inflating said first inflatable vehicle occupant protection device and a second inflator for providing inflation fluid for inflating said second inflatable vehicle occupant protection device.

* * * * *